(12) United States Patent
Chen et al.

(10) Patent No.: US 8,277,883 B2
(45) Date of Patent: Oct. 2, 2012

(54) POROUS SILICA MICROSPHERES HAVING ORGANOSILANE MODIFIED SURFACES

(75) Inventors: Wu Chen, Newark, DE (US); Ta-Chen Wei, Newark, DE (US)

(73) Assignee: Agilent Technologies, Inc., Santa Clara, CA (US)

( * ) Notice: Subject to any disclaimer, the term of this patent is extended or adjusted under 35 U.S.C. 154(b) by 451 days.

(21) Appl. No.: 12/483,500

(22) Filed: Jun. 12, 2009

(65) Prior Publication Data

US 2009/0311533 A1    Dec. 17, 2009

Related U.S. Application Data

(60) Provisional application No. 61/061,397, filed on Jun. 13, 2008.

(51) Int. Cl.
*B05D 7/00* (2006.01)
*B32B 5/16* (2006.01)

(52) U.S. Cl. .......................... 427/215; 427/220

(58) Field of Classification Search .......... 428/403–407; 427/180, 220
See application file for complete search history.

(56) References Cited

U.S. PATENT DOCUMENTS

| | | | | |
|---|---|---|---|---|
| 3,024,126 A | * | 3/1962 | Brown | 106/490 |
| 3,722,181 A | * | 3/1973 | Kirkland et al. | 95/88 |
| 3,795,313 A | * | 3/1974 | Kirkland et al. | 210/198.2 |
| 5,108,595 A | | 4/1992 | Kirkland et al. | 210/198.2 |
| 5,374,755 A | * | 12/1994 | Neue et al. | 556/400 |
| 5,908,660 A | * | 6/1999 | Griffith et al. | 427/220 |
| 5,919,298 A | * | 7/1999 | Griffith et al. | 106/490 |
| 6,090,439 A | * | 7/2000 | Menon et al. | 427/215 |
| 6,384,125 B1 | * | 5/2002 | Bergstrom et al. | 524/492 |
| 6,528,167 B2 | | 3/2003 | O'Gara | 428/405 |
| 6,686,035 B2 | | 2/2004 | Jiang et al. | 428/304.4 |
| 6,709,600 B2 | * | 3/2004 | Hrubesh et al. | 210/691 |
| 6,884,822 B2 | * | 4/2005 | Wang et al. | 516/111 |
| 6,915,664 B2 | * | 7/2005 | Jourdier et al. | 65/21.1 |
| 7,026,362 B2 | * | 4/2006 | Wang et al. | 516/111 |
| 7,125,912 B2 | * | 10/2006 | Wang et al. | 516/111 |
| 7,175,913 B2 | * | 2/2007 | O'Gara | 428/405 |
| 2006/0070937 A1 | | 4/2006 | Rustamov et al. | 210/198.2 |

FOREIGN PATENT DOCUMENTS

WO    WO2007/070001    6/2007

OTHER PUBLICATIONS

Advances in Colloid and Interface Science, 6, 95, (1976).
Wehrli, a., et al. J. Chromatography, 149:199 (1978).
Wiley, John & Sons. "An Introduction to Modern Liquid Chromatography," Chapter 7, New York, NY, 1979.
J. Chromatography, 267, 39 (1983).
J. Chromatography, 352, 199 (1986).

* cited by examiner

Primary Examiner — Hoa (Holly) Le (57) ABSTRACT

A method for preparing functionalized porous particles is disclosed, the method comprising contacting a plurality of porous silica particles with water, at least one of an ionic fluoride such as HF or $NH_4F$ or a basic activator, and a multifunctional organosilane. Also disclosed are functionalized porous silica particles produced from the methods disclosed herein.

17 Claims, 5 Drawing Sheets

POROUS SILICA MICROSPHERES HAVING ORGANOSILANE MODIFIED SURFACES

CROSS REFERENCE TO RELATED APPLICATIONS

This applications claims priority to U.S. Provisional Application Ser. No. 61/061,397, filed Jun. 13, 2008, which is hereby incorporated by reference.

BACKGROUND

1. Technical Field

The present disclosure relates to porous silica particles, and specifically to porous silica microspheres having modified surfaces that can be useful as functional supports in a variety of applications.

2. Technical Background

Functional supports are useful in many applications, including chromatography, solid phase catalysts, solid phase synthesis of polypeptides and oligonucleotides, and sequencing of polypeptides. Porous silica particles are widely used support materials as the stationary phases for reversed-phase liquid chromatography applications. In such applications, excellent mechanical stability, high surface area, and easily tailored pore size distributions make silica a superior material relative to other supports in terms of efficiency, rigidity, and performance. The surface of silica particles can also be modified to allow a manufacturer to custom produce a variety of stationary phases having tailored chromatographic selectivities.

Silanes are commonly used surface modifying reagents in liquid chromatography applications. For example, "An Introduction to Modern Liquid Chromatography," Chapter 7, John Wiley & Sons, New York, N.Y. 1979; J. Chromatogr. 352, 199 (1986); J. Chromatogr., 267, 39 (1983); and Advances in Colloid and Interface Science, 6, 95 (1976) each disclose various silicon-containing surface modifying reagents. For reversed-phase chromatography, a traditional silane coupling agent is $Si(CH_3)_2(C_{18}H_{37})$, where $C_{18}H_{37}$ (octadecyl group) yields a hydrophobic surface. In order to covalently attach these silyl groups, silanol (Si—OH) groups are needed on the silica surface.

Silica particles can be strengthened by heating at about 900° C., but such treatment can result in a dehydroxylated silica surface comprising siloxane groups (Si—O—Si), which are generally not reactive with silanizing agents. Accordingly, a rehydroxylation step is typically performed to regenerate silanol groups on the surface prior to silanizing the silica particles.

Common rehydroxylation methods include boiling calcined silica particles in water for extended periods of time or in dilute nitric acid or hydrochloric acid from several hours to up to several days. For example, U.S. Pat. No. 5,108,595 to Kirkland et al. discloses a rehydroxylation process to prepare silanol-enriched surfaces in water in the presence of a basic activator such as ammonium hydroxide, or in the presence of HF solution. While such methods can rehydroxylate the silica surface, the pore structure of the silica particles can be adversely affected. For example, as disclosed in U.S. Pat. No. 5,108,595, equilibrium is reached during the boiling process in the presence of the basic activator or HF solution and silica repeatedly dissolves and precipitates back to the surface of the particles, effectively eliminating micropores and widening mesopores in the silica surface. Also, during cooling, the silica dissolved in the solution can precipitate on the particle surface, forming a new surface layer. As a result, the silica particles after rehydroxylation can have a lower surface area and larger pores than desired.

Recently, hybrid silica particles have become popular for HPLC columns as a new generation HPLC column packing material because of their stability in high pH environments and their physical strength under higher pressures. U.S. Pat. No. 6,686,035 to Waters et al. discloses a method to prepare a porous inorganic/organic hybrid material for chromatography applications. The hybrid silica material is modified by hydrothermal treatment by preparing a slurry in an autoclave at an elevated temperature, e.g., 143° C. to 168° C. and a pH of from 8.0 to 10.7 for a period of 6 to 28 hours. The hydrothermal treatment enlarges the openings of the pores as well as the pore diameters, and forms silanol groups on the surface. The resulting hybrid silica surface has less silanol groups because of the presence of surface organic groups (e.g., methyl groups) which lead to lower bonded phase surface concentrations after silanization, presumably due to the unreactive organic groups on the surface. U.S. Pat. No. 6,528,167 discloses a method to replace surface organic groups on such hybrid materials with surface silanol groups by reacting the hybrid materials with aqueous $H_2O_2$, KF, and $KHCO_3$ in an organic solution. U.S. patent Publication No. 2006/0070937A1 to Rustamov et al. discloses a method to form a multilayer article of inorganic/organic layers by surface chemical polycondensation of trifunctional and difunctional organosilanes. This process, however, involves multiple repeating steps of reacting trifunctional and difunctional organosilanes, hydrolyzing any unreacted leaving groups, and dehydrating the sorbent.

Thus, there is a need to address the aforementioned problems and other shortcomings associated with traditional porous silica particles. These needs and other needs are satisfied by the compositions and methods of the present disclosure.

SUMMARY

In accordance with the purpose(s) of the invention, as embodied and broadly described herein, this disclosure, in one aspect, relates to porous silica particles, and specifically to porous silica microspheres having modified surfaces that can be useful as functional supports in a variety of applications, such as chromatographic materials.

In one aspect, the present disclosure provides a method for preparing functionalized porous particles, the method comprising contacting a plurality of porous silica particles with: water; at least one of an ionic fluoride or a basic activator; and a multifunctional organosilane.

In another aspect, the present disclosure provides a method for preparing functionalized porous particles, the method comprising contacting a plurality of porous silica particles with: water; at least one of an ionic fluoride or a basic activator; and an organosilane comprising one or more compounds having the formula $R^1_a R^2_b SiX_{4-a-b}$ or $R(R^1_a SiX_{3-a})_n$, where $R^1$ and $R^2$ are organic ligands containing 1-4 carbon atoms, R is a substituted or unsubstituted aliphatic, cyclic, arylic, or aromatic, X is a leaving group attached to the silicon atom, a and b are positive integers equal to 0 or 1, a plus b equals to 0, 1 or 2, and n is a positive integer equal to 2-8

In yet another aspect, the present disclosure provides a plurality of functionalized porous silica particles produced by the various methods recited herein.

BRIEF DESCRIPTION OF THE FIGURES

The accompanying figures, which are incorporated in and constitute a part of this specification, illustrate several aspects and together with the description serve to explain the principles of the invention.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein. Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a solvent" includes mixtures of two or more solvents.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— repeat units in the polyester, regardless of whether ethylene glycol is used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"A," "$A^1$," "$A^2$," "$A^3$," and "$A^4$" are used herein as generic symbols to represent various specific substituents. These symbols can be any substituent, not limited to those disclosed herein, and when they are defined to be certain substituents in one sentence does not mean that, in another sentence, they cannot be defined as other substituents.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxamate, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkylalcohol" specifically refers to an alkyl group that is substituted with one or more hydroxyl groups, as described below. The term "alkylthiol" specifically refers to an alkyl group that is substituted with one or more thiol groups, as described below. The term "alkylalkoxy" specifically refers to an alkyl group that is substituted with one or more alkoxy groups, as described below. The term "alkylamino" specifically refers to an alkyl group that is substituted with one or more amino groups, as described below, and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," a particular substituted alkynyl can be, e.g., an "alkynylsilyl," a particular substituted aryl can be, e.g., a "nitroaryl," a particular substituted cycloalkyl can be, e.g., a "cycloalkylether," a particular substituted heterocycloalkyl can be, e.g., a "heterocycloalkylnitro," a particular substituted cycloalkenyl can be, e.g., a "alkylcycloalkenyl," a particular substituted heterocycloalkenyl can be, e.g., a "heterocycloalkenylthiol," and the like. When "alkyl" is used in one sentence and a specific term such as "alkylalcohol" is used in another, it is not meant to imply that the term "alkyl" does not also refer to specific terms such as "alkylalcohol" and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group may be defined as —OA where A is alkyl as defined above.

The term "alkenyl" as used herein is a hydrocarbon group of from 2 to 24 carbon atoms with a structural formula containing at least one carbon-carbon double bond. Asymmetric structures such as (AB)C=C(CD) are intended to include both the E and Z isomers. This may be presumed in structural formulae herein wherein an asymmetric alkene is present, or it may be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxamate, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxamate, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxamate, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxamate, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and contains at least one double bond, e.g., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxamate, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The terms "amine" or "amino" as used herein are represented by the formula $NAA^1A^2$, where $A$, $A^1$, and $A^2$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH.

The term "hydroxyl" as used herein is represented by the formula —OH.

The term "silyl" as used herein is represented by the formula —$SiAA^1A^2$, where $A$, $A^1$, and $A^2$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

"R," "$R^1$," and "$R^2$," as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As used herein, the expression "support material" or "chromatographic material" means granules capable of forming a packed bed or column having 1) sorptively active surfaces or 2) surfaces capable of being coated with a sorptively active substance to form sorptively active surfaces.

The expression "silanized surface" means that organosilyl groups are incorporated into the surface.

The term "porous", unless specifically stated to the contrary, is intended to refer to any type or degree of porosity, including superficial porosity, and varying sizes and extents of micropores, mesopores, and/or macropores.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture.

In various aspects, the present invention provides a support material comprising a porous silica particle, such as for example, a crush-resistant porous silica microsphere, having a silanol-enriched surface. In another aspect, such a porous silica particle can exhibit desirable sorptive properties for separating organic compounds, such as for example, basic compounds. In other aspects, such porous silica microspheres can permit the preparation of silanized surfaces with enhanced chemical stability.

Although the support material of the present invention will be described primarily in connection with its use in chromatography applications, it should be understood, however, that such support materials have wider applicability such as, for example, as solid phase catalysts, solid phase synthesis of polypeptides and oligonucleotides, and sequencing of polypeptides.

In various aspects, the present invention provides a process for preparing porous silica particles, such as, for example, porous silica microspheres. In one aspect, such porous silica particles can have an average diameter of 0.5 to about 50 μm. In another aspect, all or substantially all of the porous silica particles can have a diameter ranging from about 0.5 to about 1.5 times the average diameter of a plurality of particles. In yet another aspect, all or a portion of the porous silica particles can have a silanized surface.

In one aspect, the method comprises contacting a porous silica particle with water in the presence of: (a) fluoride ion ($F^-$) such as, for example, HF or $NH_4F$, or at least one basic activator, and (b) a multifunctional organosilane. In another aspect, the invention provides a single step method for functionalizing porous silica particles.

In one aspect, the methods of the present invention can be applied to a variety of particles. In another aspect, any porous particles suitable for use with the various methods and aspects disclosed herein can be used. In various aspects, the porous particles of the present invention can comprise silica, such as, for example, porous silica particles, monolithic silica, hybrid monolithic silica, hybrid silica particles, superficially porous silica particles, superficially porous hybrid silica particles, totally porous silica particles, and combinations thereof. In one aspect, the porous silica particles comprise totally porous silica particles. In another aspect, the porous silica particles comprise superficially porous silica particles. In yet another aspect, the porous silica particles can comprise a mixture of totally porous and superficially porous silica particles.

In one aspect, the porous silica particles of the present invention comprise porous silica microspheres that have an average diameter of from about 0.5 to about 35 μm, from about 0.5 to about 20 μm, or from about 1.0 to about 10 μm. As used herein, the expression "average diameter" means the statistical average of the spherical diameters of the microspheres. The microspheres can, in one aspect, be substantially uniform in size such that less than 5% of the microspheres have a diameter less than about 0.5 times the average diameter and less than 5% have a diameter greater than 1.5 times the average diameter. In another aspect, the range is about 0.8 to about 1.2 times the average diameter. Furthermore, the microspheres can have controlled pore dimensions and a relatively large pore volume.

In one aspect, the porous silica particles can be produced from a coacervation technique. In another aspect, the porous silica particles can comprise heat strengthened thermally dehydroxylated porous silica microspheres, such as, for example, those described in U.S. Pat. No. 3,782,075, which is hereby incorporated by reference in its entirety and for the purpose of disclosing heat strengthened thermally dehydroxylated porous silica microspheres and methods related to the production thereof.

Such heat strengthened particles can, in various aspects, be formed by contacting an aqueous sol of silica with a copolymerizable mixture of urea and formaldehyde or melamine and formaldehyde. Once polymerization is initiated, coacervation of the organic material occurs resulting in microspheres containing the colloidal particles. The microspheres can then be solidified, collected, washed and dried. At this stage, the microspheres consist of a plurality of colloidal particles embedded in a sphere filled with polymer. The organic material can then be burned off at a temperature sufficient to oxidize the organic constituents without melting or adversely affecting the inorganic material. In one aspect, the organic material can be burned by heating to a temperature of about 550° C. The porous microspheres can then be sintered at an elevated temperature for a time sufficient to strengthen the microparticles, for example, to the point where they will not fracture in use. In one aspect, sintering can be performed until the specific surface area of the microspheres has been reduced to a value which is at least 10% less than the surface area of the colloidal particles themselves.

Formation of the microspheres proceeds by association of the inorganic colloidal particles with the organic coacervate. While not wishing to be bound by theory, it is believed that the uniformity in both the size of the microspheres and the distribution of the colloidal particles within the microspheres depends on an interaction between hydroxyl groups on the surface of the colloidal particles and portions of the organic polymer chains in the coacervate materials. For this reason, in one aspect, at least prior to the onset of polymerization, the colloidal particles should have hydroxyl groups on their surface equivalent to a hydrated oxide surface.

In various aspects and for certain applications, it is desirable that the resulting functionalized particles of the present invention be colloidal in size, such that at least two of the dimensions of these particles will be in the range of, for example, 3 nm to 500 nm and the other dimension will be in the range of 3 nm to 1000 nm. Particles having one dimension greater than a μm or having any dimension greater than about 0.1 times the diameter of the microspheres can be difficult to incorporate into spherical microparticles since the large dimension interferes with the formation of discrete spherical units.

The organic components used to form microspheres can vary and one of skill in the art, in possession of this disclosure, could readily select appropriate components. In one aspect, the components are initially soluble in water and miscible with the silica colloid without flocculating or dissolving the silica at the pH at which the reaction occurs. In another aspect, the polymer, once formed, should be substantially insoluble in water. While a variety of organic materials are suitable, a high degree of uniformity in both particle size and pore size distribution can occur when a copolymerizing mixture of urea and formaldehyde or melamine and formaldehyde is used. In one aspect, urea and formaldehyde can be used in a molar ratio of about 1 to 1.2 or 1.5 and a pH of about 1.0 to 4.5. In another aspect, melamine and formaldehyde can be used in a molar ratio of about 1 to 3 and a pH of about 4 to 6 are suitable. In other aspects, other components and/or combinations of components can be used.

In one aspect, the ratio of organic material to silica should be such that after polymerization, the precipitated particles contain about 10 to 90 weight percent of silica. In another aspect, the volume percent of inorganic material can range from about 10 to about 50. To obtain coherent porous spheres after the organic matter is burned out, in one aspect there should be a sufficiently high concentration of silica particles within the matrix to link together into a three-dimensional matrix. Such a network may be very fragile, when obtained at 550° C., but if heated undisturbed at higher temperatures to initiate sintering, can result in porous microspheres having improved strength. To insure that sufficient sintering has occurred to provide the desired strength, the particles can, in various aspects, be sintered at a higher temperature, such as, for example, above 900° C., which is sufficiently high to reduce the specific surface area of the particle by at least 10% below the value for the colloidal particles from which they are formed. The resulting microspheres can have uniform or substantially uniform pores, the diameters of which depend on the size of the colloidal particles used in their preparation and the volume ratio of the organic polymer to the silica material used. In one aspect, the larger the colloidal particles, the larger the pores between them, and the greater the proportional volume of organic polymer in the microspheres when formed, the more open the network of silica particles and the wider the pores.

Heating, for example, calcining, particles to induce sintering can have multiple effects. First, the particles making up the porous structure sinter or fuse together to some extent at their points of contact to increase the physical strength of the microspheres. Second, the hydroxylated surface of silanol groups present before being heated can be dehydroxylated, i.e., water is lost by condensation of neighboring SiOH groups, generally leaving most of the surface consisting of siloxane groups, Si—O—Si. Generally, these siloxane groups are inert to reaction with silanizing agent. In various aspects, it has been found that the resulting microspheres can have a total concentration of surface silanol groups of substantially less than about 5.5 $\mu mol/m^2$. Such microspheres can be generally unreactive with silanizing agents unless the surface is rehydroxylated.

In one aspect, the porous silica particles of the present invention have a concentration of surface silanol groups of less than about 8 $\mu mol/m^2$, less than about 6 $\mu mol/m^2$, or less than about 4 $\mu mol/m^2$. In another aspect, the porous silica particles of the present invention comprise heat strengthened thermally-dehydroxylated porous silica microspheres having a surface concentration of silanol groups of less than about 8 $\mu mol/m^2$.

In one aspect, the surface concentration of silanol groups refers to the number of moles of silanol groups which are detectable by thermogravimetric analysis (TGA) divided by the surface area of the silica microspheres (i.e., moles silanol groups per $m^2$). It is known that the surface of the silica microspheres can have a maximum concentration of exposed silanol groups of about 8 $\mu mol/m^2$. Silanol groups in excess of this maximum concentration are "buried" beneath the surface of the silica. TGA is capable of measuring the sum of exposed surface silanol groups and "buried" silanol groups.

In one aspect, rehydroxylation of the silica surface needs to occur to add silanol groups which, in turn, will react with the silanizing agent present in the reaction mixture. In another aspect, activators that can promote rehydroxylation of the silica surface to the desired concentration of silanol groups are F⁻ ion such as, for example, HF or NH₄F, and basic activators, such as, for example, of quaternary ammonium hydroxides, ammonium hydroxide, and organic amines.

In one aspect, the porous silica particles can be contacted with an ionic fluoride, such as, for example, hydrofluoric acid (HF). In various aspects, the ionic fluoride can comprise one or more suitable ionic fluoride species of the same or varying composition. In one aspect, the ionic fluoride comprises hydrofluoric acid (HF). In another aspect, the ionic fluoride comprises $NH_4F$. In another aspect, the ionic fluoride comprises a combination of ionic fluorides, such as, for example, HF and $NH_4F$. In yet another aspect, the ionic fluoride comprises one or more other ionic fluoride species. In another aspect, the ionic fluoride is acidic, such as, for example, an acidic solution. In one aspect, the ionic fluoride does not contain a metal or metalloid cation that could contaminate the silica particles. In another aspect, the ionic fluoride does not contain a concentration of metal or metalloid cations that would adversely affect the resulting silica particles and/or their performance in, for example, a chromatographic application.

The specific composition and concentration of an acidic solution of ionic fluoride can vary, and the present invention is not limited to any particular ionic fluoride solution. The pH of an acidic solution of ionic fluoride can be adjusted if necessary, such that the pH is sufficiently low. In various aspects, the desired pH can be from about 2 to about 4. If necessary, other acids, such as, for example, a mineral acid or sulfuric acid can be used to adjust the pH of the solution. In various aspects, the concentration of HF in solution is from about 50 ppm to about 1600 ppm, or from about 100 ppm to about 400 ppm. In one aspect, HF in a concentration of from about 200 to about 400 ppm can be suitable to activate the rehydroxylation of a 300 m²/g to 400 m²/g silica. While not wishing to be bound by theory, tt is believed that fluoride, introduced as HF or an ionic salt thereof at a pH from about 2 to about 4, reacts with a small amount of dissolved silica to form $SiF_6^{-2}$. The $SiF_6^{-2}$ can remain in equilibrium with a low concentration of HF, functioning as an activator to increase the rate of silica hydroxylation.

In another aspect, the porous silica particles can be contacted with a basic activator. In various aspects, the basic activator can comprise a quaternary ammonium hydroxide, ammonium hydroxide, an organic amine, or a combination thereof. In yet another aspect, the basic activator comprises tetraalkylammonium hydroxide, ammonium hydroxides, primary organic amines and secondary organic amines.

In one aspect, the relative rate of dissolution of silica by a basic activator can be controlled by maintaining the solution pH in the weakly-basic range. Many primary and secondary organic bases can rapidly dissolve silica above a pH of about 10.5, and more slowly at lower pH values. In one aspect, a basic activator that provides a buffered pH of about 10.5 in dilute solution has desirable properties, such as, for example, when hydroxylation is carried out at from about 25° C. to about 50° C. At such temperatures, the solubility and the rate of transfer of silica can be much lower than at higher temperatures such as 100° C. In another aspect, a basic activator can be added in a sufficient amount to generate a pH of from about 9 to about 10.5. In another aspect, the concentration of a basic activator in solution can be from about 50 ppm to about 1600 ppm, or from about 100 ppm to about 400 ppm.

For basic activators the overall rate of attack on the silica surface generally decreases from methyl to ethyl to propyl. For example, normal ethyl-, propyl-, and butylamine, secondary ethylpropyl- and butylamine can be effective activators. Monomethyl- and dimethylamine can be utilized, if care is exercised. Steric effects appear to have a noticeable influence on the dissolution rate of the silica gel latice as disclosed by A. Wehrli, J. C. Hildenbrand, H. P. Keller, R. Stampfli, R. W. Frei, J. Chromatogr., 149:199 (1978). Methyl amines can be less practical because of their strong tendency to attack silica. Thus, methyl amines are more difficult to control in generating the desired concentration of silanol groups. In one aspect, tt has been found that the rate of attack of a base on silica is dependent on the strength ($pK_B$ value), concentration, and geometry of a selected basic activator.

In one aspect, a basic activator can comprise one or more tetraalkylammonium hydroxides. Although tetraalkylammonium hydroxides show strong aggressiveness for dissolving silica, these compounds are can be suitable basic activators for rehydroxylation, even though tetramethylammonium, tetrapropylammonium and tetrabutylammonium hydroxide show equal or an even greater tendency than alkali hydroxides to attack the silica surface. Tetraalkylammonium hydroxides can be effective activators because at a pH of from about 9 to about 10.5, very little free base remains in solution. While not wishing to be bound by theory, tt is believed that most of the base is absorbed as a monolayer on the silica surface, making the silica somewhat hydrophobic. Hydroxyl ions remaining in solution catalyze the breaking of siloxane groups, while the monolayer of activator on the silica surface retards dissolution and deposition of silica. Therefore, the process can be conveniently interrupted before the degree of hydroxylation passes beyond the desired range.

In another aspect, a basic activator can comprise tetrabutylammonium hydroxides, ammonium hydroxide, a primary organic amine, or a combination thereof. When a sufficient amount of such a basic activator is added to an aqueous suspension of microspheres to raise the pH to a value between 9 and 10.5, very little free base remains in solution. Most of the base is adsorbed as a monolayer on the silica surface making the silica surface somewhat hydrophobic. Hydroxyl ions remaining in solution catalyze the breaking of siloxane groups while the monolayer of activator on the silica surface retards dissolution and deposition of silica. This process can be stopped before rehydroxylation of the microspheres passes beyond the desired concentration of silanol groups. In one aspect, the primary and secondary amines contain hydrocarbon groups that retard dissolution of silica.

In yet another aspect, a basic activator can comprise ammonium hydroxide. In an exemplary aspect, a dilute ammonium hydroxide at pH 10 can be contacted with silica for about 18 hours and at about 25° C. to rehydroxylate a silica surface to the desired concentration of silanol groups. In such an aspect, hydrolysis of a 440 m²/g silica by this procedure changed the surface area by only about 25%, and the pore volume of the silica remained essentially unchanged.

In another aspect, a basic activator comprises at least one primary amine. Such a primary amine can comprise ethylenediamine, n-propylamine and n-butylamine, or a combination thereof. Such amines can generate a pH of from about 9 to about 10.5. A pH in this range can accelerate rehydroxylation of the silica surface, without significant change in the surface area and pore diameter of the silica structure as can occur with strong organic bases such as quaternary ammonium hydroxides. When the latter are used as activators, their concentration should be low and the initial pH should not exceed about 10. In another aspect, secondary amines such as diethyl-, dipropyl-, dibutylamine, and combinations thereof are also suitable activators but rehydroxylation reactions are generally slower. Similarly, tertiary amines can be used, but are generally even slower.

In another aspect, alkali- or alkaline-earth hydroxides such as NaOH, KOH and CaOH can be difficult to control in the rehydroxylation process. Use of these agents can result in significant undesirable changes in the pore structure and surface area of the starting silica. In addition, use of these agents can result in an undesired contamination of the starting silica with the cation from the hydroxide. This contamination causes deleterious effects with the silica support in subsequent chromatographic uses.

In the various methods of the present invention, the porous silica particles are contacted with water, either a fluoride ion such as, for example, HF or $NH_4F$, or a basic activator, and a multifunctional organosilane. In one aspect, the organosilane of the present invention can comprise any difunctional, trifunctional, tetrafunctional organosilane, or combinations thereof. In another aspect, the organosilane comprises one or more compounds having the formula $R^1_a R^2_b SiX_{4-a-b}$ or $R(R^1_a SiX_{3-a})_n$, where R is a substituted or unsubstituted aliphatic, cyclic, arylic or aromatic, but preferably unsubstituted, saturated aliphatic organic moiety containing 1-8 but preferably 1-3 carbon atoms, $R^1$ and $R^2$ are organic ligands containing 1-4 but preferably 1-2 carbon atoms, X is a leaving group attached to the silicon atom, for instance, Cl, $OCH_3$, $OC_2H_5$, $(CH_3)_2N$, $(CH_3CH_2)_2N$, I, Br, CN, $OOCH_3$, $O(CO)CH_3$, $O_3SCF_3$, where a and b are positive integers equal to 0 or 1, and a plus b equals to 0, 1 or 2, n is a positive integer equal to 2-8 but preferably 2.

In another aspect, exemplary organosilanes can comprise bis(triethoxysilyl)ethylene, bis(triethoxysilyl)proplynene, bis(triethoxysilyl)methylene, methyltriethoxysilne, ethyltriethoxysilane, propyltriethoxysilane, butyltriethoxysilane, dimethyldiethoxysilane, diethyldiethoxysilane, phenyltriethoxysilane, and combinations thereof. Suitable silanizing agents are also disclosed in U.S. Pat. Nos. 3,722,181 and 3,795,313, the disclosures of which are incorporated herein by reference for the purpose of disclosing suitable silanizing agents. In a specific aspect, the organosilane comprises bis (triethoxysilyl)ethylene.

In another aspect, the organosilane comprises a tetrafunctional organosilane. Exemplary tetrafunctional organosilanes can comprise tetraethoxysilane, tetra(dimethylamino)silane, tetrachlorosilane, tetraacetoxysilane, and combinations thereof. In a specific aspect, the organosilane comprises tetraethoxysilane, otherwise known as tetraethyl orthosilicate (TEOS). In various aspects, the pore size of a resulting particle can be controlled by using a tetrafunctional organosilane, such as, for example, TEOS. While traditional methods and materials can enlarge the pores of a porous particle, the use of a tetrafunctional organosilane, such as, for example, TEOS, can provide the ability to control the pore size of a resulting particle. In one aspect, TEOS, when hydrolyzed, can react and deposit on the surface of the pores. In one aspect, a higher concentration of TEOS can result in less loss of surface area, lower pore volume, and thus smaller average pore size in the resulting particles.

It should be understood that the specific composition and concentration of a multifunctional organosilane can vary, and the present invention is not intended to be limited to any particular organosilane or concentration.

In one aspect, the multifunctional organosilane is present in the aqueous solution comprising HF or at least one basic activator in an amount of from 1% to 30% of silica particles by weight, or from about 2% to 10% of silica particles by weight. In various aspects, the multifunctional organosilane can be added into the solution either dropwise under agitation or by all at once.

Figure 1A:
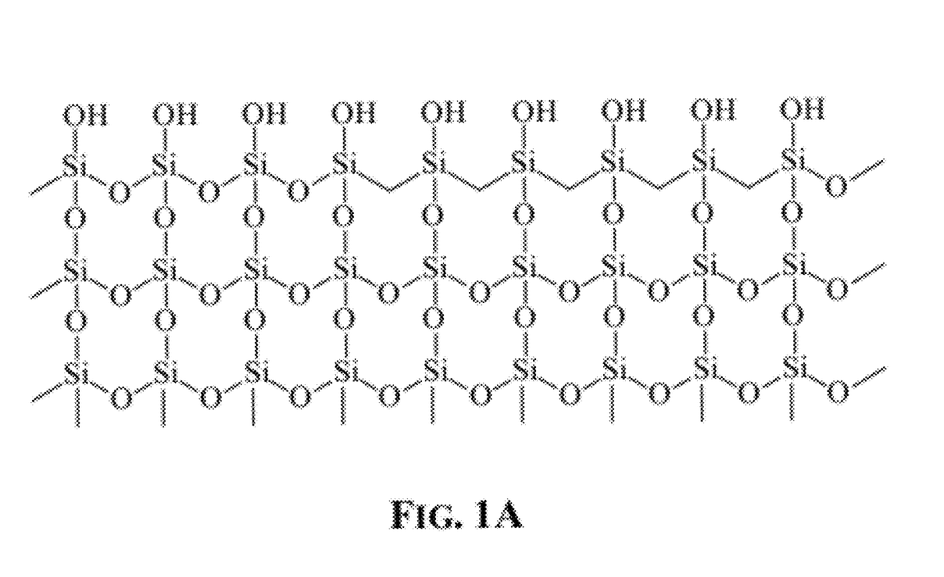
FIG. 1 is a graphical representation of silica surface (A) before and (B) after modification according to the present invention.
Figure 1B:
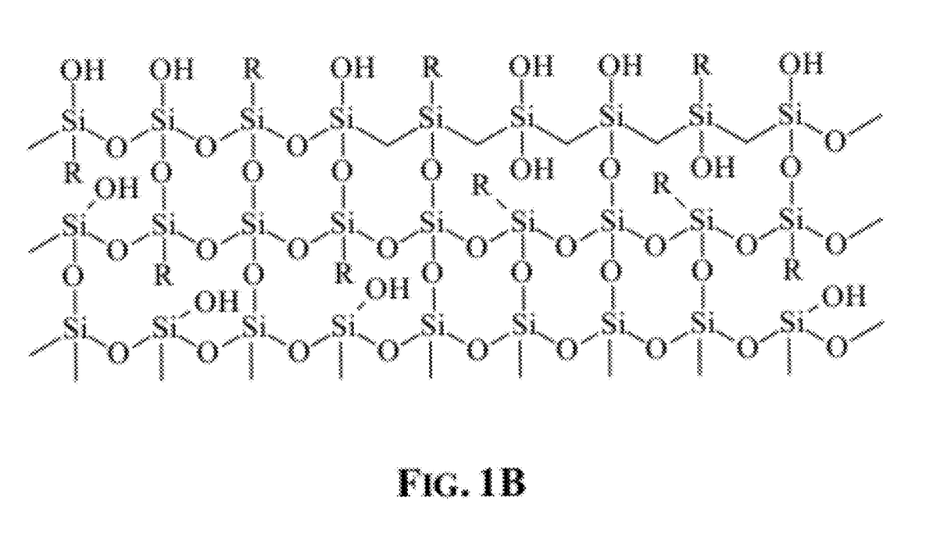

In one aspect, at least a portion of the surface of the silica particles can comprise newly generated material once the reaction is completed. In another aspect, the modified surface can comprise organosilicon groups on the surface when difunctional and trifunctional organosilanes are employed. An example of such surface is shown in FIG. 1B along with an illustration of the original silica surface (FIG. 1A). In such an aspect, the secondary silanols of the modified silica surface may serve as the points of attachment for further surface modification by commonly employed mono-, di-, or tri-functional organosilanes for chromatographic resins, of the following general formulas $R^1SiX_3$, $R^1R^2SiX_2$, $R^1R_2^2SiX$ respectively, where $R^1$ and $R^2$ are as defined above. When tetrafunctional organosilanes are employed, the modified surface can, in various aspects, comprise a new layer of silanol groups. Such new surface silanol groups can, in one aspect, be further modified by reaction with, for example, mono-, di-, or trifunctional organosilanes. In another aspect, endcapping can be applied by conventional means known in the art.

The specific method, rate, and/or conditions of contacting the porous silica particles, water, an ionic fluoride or basic activator, and multifunctional organosilane can vary, depending on, for example, the specific components and/or concentrations thereof, and the present invention is not intended to be limited to any particular conditions and/or method of contacting. In one aspect, contacting is performed at a temperature of from about ambient to about 100° C. for a sufficient period of time to generate the desired surface concentration of silanol groups. In another aspect, contacting is performed at a temperature of from about 25° C. to about 100° C. for a sufficient time to generate the desired surface concentration of silanol groups.

The resulting functionalized porous silica particles of the present invention can, in various aspects, have a total concentration of silanol groups of from about 6 to about 16 µmol/m², preferably from about 8 to about 16 µmol/m². The silanol-enriched microspheres can provide a chromatographic material which exhibits high hydrolytic stability and a low adsorption of basic compounds. In one aspect, the silanol-enriched microspheres can be contacted with a silanizing agent to form crush resistant microspheres having a silanized surface. In another aspect, the silanized microspheres can exhibit enhanced chemical stability with respect to hydrolysis.

In another aspect, the resulting microspheres of the present invention can provide high mechanical stability when used in, for example, columns for high pressure liquid chromatography. While not wishing to be bound by theory, it is believed that the stability results from a portion of the silica being dissolved by water containing HF or a basic activator and subsequently being re-precipitated at points of contact between the colloidal particles making up the aggregate structure of the porous silica microspheres. Thus, the re-precipitated silica provides additional reinforcement to the structure of the silica microspheres.

The extent of silanization on the silica surface can be determined in several ways including, for example, infrared spectroscopy, solid-state magic angle spinning nuclear magnetic resonance, proton spin counting NMR, and/or thermogravimetric analysis.

In one aspect, the functionalized porous silica particles of the present invention can exhibit superior performance in various forms of liquid chromatographic applications including bonded-phase, liquid-solid and size-exclusion. For example, highly efficient liquid-solid chromatography can be carried out with microspheres having a diameter in the 1.0 to 15.0 µm range made from colloidal particles in the 5 to 50 nm range. High speed bonded-phase packings can be prepared by coating microspheres having a diameter in the 1.0 to 15.0 μm range and made from colloidal particles in the 50 to 100 nm range, with appropriate covalently bonded organic ligands or with polymerized coatings. These particles can also be reacted with ion-exchange media to produce supports for ion-exchange chromatography. The range of useful microsphere diameters extends from about 0.5 to 50 μm.

Silica microspheres with pores of known dimension can be used for high speed size-exclusion chromatographic separation such as gel permeation and gel filtration. These separation techniques are based on the differential migration of molecules based on molecular size or molecular weight considerations. Small particle size promotes rapid mass transfer so that mobile phase velocities much higher than normal can be used while still maintaining equilibrium in the diffusion-controlled interaction that takes place within the pores in the totally porous structure. The strong, rigid characteristics of the present microspheres permit their use at very high pressures without particle degradation or deformation. The spherical nature of the particles permits the packing of columns with a large number of theoretical plates, which is of particular importance in the separation of large molecules. Of prime consideration in the size-exclusion chromatographic process is the internal volume of the particles used in the separation. The pore volume of the particles is moderately high in the microspheres, usually from 50 to 65% (measured by $N_2$ adsorption with the B.E.T. method) which is comparable to that found for the porous glasses and the porous organic gels widely used for size-exclusion chromatography.

The silica microspheres are also useful in gel filtration separations in aqueous systems and for the separation of small polar molecules. Microspheres having pores in the 50 to 2500 Angstroms range permit the high-speed size-exclusion chromatographic separation of a large variety of compounds in both aqueous and nonaqueous systems.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

In a first example, 5 μm Rx80 silica particles from Agilent Technologies, with a surface area of 189 $m^2$/g and a pore size of 80 Å were directly bonded with Eclipse Plus C18 silane (Agilent Technologies, Inc.). The resulting particles were endcapped using conventional processes known in the art.

Example 2

In a second example, the silica used in Example 1 was surface-modified in 400 ppm HF and 1,2-bis(triethoxysilyl) ethane solution. 40 g of 5 μm Rx80 silica particles were slurried in 400 ml of a 400 ppm HF solution in a round bottom flask equipped with a condenser. To this solution, 1 gram of 1,2-bis(triethoxysilyl)ethane was added and the mixture was refluxed for 24 hours. The mixture was then allowed to cool to room temperature and settle overnight. The top water layer was decanted, and 400 ml of water was added. The slurry was heated again to reflux for 24 hours. The mixture was then allowed to cool to room temperature and settle overnight. 400 ml of acetone was then added and slurried with the silica. The resulting silica particles were filtered, washed with acetone, and dried in a vacuum oven at 100° C. for at least 2 hours. The carbon loading was measured to be 0.30% by elemental analysis.

Example 3

In a third example, 40 g of 5 μm Rx80 silica particles with a surface area 189 $m^2$/g and a pore size of 80 Å were processed according to Example 2, except that 2 g instead of 1 g of 1,2-bis(triethoxysilyl)ethane were included in the slurry. The carbon loading was measured to be 0.89% by elemental analysis.

Referring to Table 1, below, the particle size and pore size, as measured by BET $N_2$ adsorption, did not change significantly after surface modification; however, the elemental analysis results demonstrate that the organic hydrocarbon is incorporated into the surface. The HPLC columns based on silica particles with organic groups incorporated into the surface show improved peak shapes for strong bases. With organic groups on the surface, the pH stability of such columns should also be improved as compared to the silica particles without any modification.

TABLE 1

| Organosilane to silica weight ratio | Carbon loading after HF | Surface area ($m^2$/g) | Pore size (Å) | Pore volume ($cm^3$/g) |
|---|---|---|---|---|
| No further HF treatment | 0 | 189 | 87 | 0.43 |
| 1: 40 (Example 2) | 0.30-0.32 | 178 | 92 | 0.43 |
| 2: 40 (Example 3) | 0.88-0.89 | 181 | 89 | 0.41 |

The principle and process can be applied on porous or nonporous silica particles, monolithic silica, hybrid monolithic silica, hybrid silica particles, superficially porous silica particles, superficially porous hybrid silica particles.

Example 4

In a fourth example, 31.03 g of 5 μm silica particles from Daiso Co. (Osaka, Japan), with a surface area of 300 $m^2$/g and a pore size of 154 Å were slurried in 310 ml of a 400 ppm HF solution in a round-bottom flask equipped with a condenser. 3.10 g of 1,2-bis(triethoxysilyl)ethane were added to the solution. The mixture was refluxed for 24 hours, and was then allowed to cool to room temperature and settle overnight. The top water layer was decanted, and 400 ml of water was added. The slurry was again heated to reflux for 24 hours. The mixture was then allowed to cool to room temperature and settle overnight. To the resulting mixture, 400 ml of acetone were added to slurry the silica. The silica particles were filtered, washed with acetone, and dried in vacuum oven at 100° C. for at least 2 hours. The carbon loading was measured to be 0.84%.

Example 5

In a fifth example, 20 g of 5 μm silica particles from Daiso Co. (Osaka, Japan) with surface area 300 $m^2$/g and pore size of 154 Å were slurried in 200 ml 400 ppm HF solution in a round bottom flask equipped with a condenser. To the slurry, 2 g of ethyltriethoxysilane was added. The mixture was refluxed for 24 hours, and was then allowed to cool to room temperature and settle overnight. The top water layer was decanted, and 200 ml of water was added. The slurry was again heated to reflux for 24 hours. The mixture was then allowed to cool to room temperature and settle overnight. Then, 200 ml of acetone was added to slurry the silica. The silica particles were filtered, washed with acetone, and dried in vacuum oven at 100° C. for at least 2 hours. The carbon loading was measure to be 1.38%.

Example 6

In a sixth example, 20 g of 5 μm silica particles from Daiso Co. (Osaka, Japan), with a surface area of 300 $m^2$/g and a pore size of 154 Å were processed as in Example 5, except that 2 g of methyltriethoxysilane instead of ethyltriethoxysilane was added. The carbon loading was measured to be 0.92%.

Example 7

In a seventh example, as described in Table 2, below, silica particles made from Examples 2-4 were bonded with Eclipse Plus-C18 phase under reflux conditions in toluene. After reaction, the silica particles were further endcapped using conventional processes known in the art under reflux condition in toluene.

TABLE 2

| Silica | % Carbon after Eclipse Plus C18 bonding |
| --- | --- |
| Example 1 | 9.61 |
| Example 2 | 9.34 |
| Example 3 | 9.41 |
| Example 4 | 14.09 |
| Daiso silica, no treatment | 14.96 |

Example 8

In an eighth example, a comparison of a reversed-phase Eclipse Plus C18 column on organosilane modified silica with non-modified silica was performed. Five analytes were eluted using a mobile phase comprising 40% 20 mM phosphate, pH 7.0 and 60% acetonitrile. The dimensions of each column were 4.6×100 mm. The flow rate was set to 1.0 mL/min with a column temperature of 24° C. The analytes were (1) uracil, (2) propranolol, (3) nortiptyline, (4) imipramine and (5) amitriptyline.

Figure 2A:
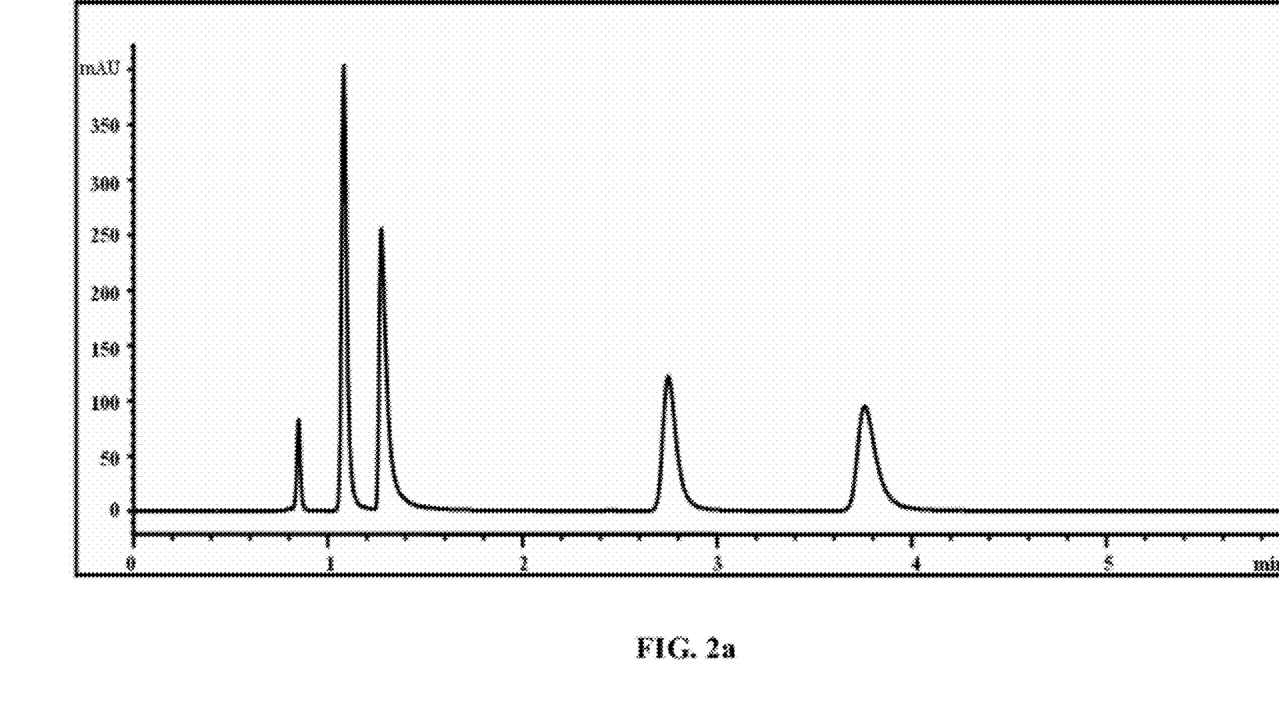
FIG. 2(a) is an HPLC chromatogram generated from an Eclipse Plus C18 column on: (a) Rx80, with tailing factor of amitriptyline (last peak) of 1.67; (b) organosilane modified silica in accordance with various aspects of the present invention, with tailing factor of amitriptyline (last peak) of 1.39; and (c) organosilane modified silica in accordance with various aspects of the present invention, with tailing factor of amitriptyline (last peak) of 1.23.
Figure 2B:
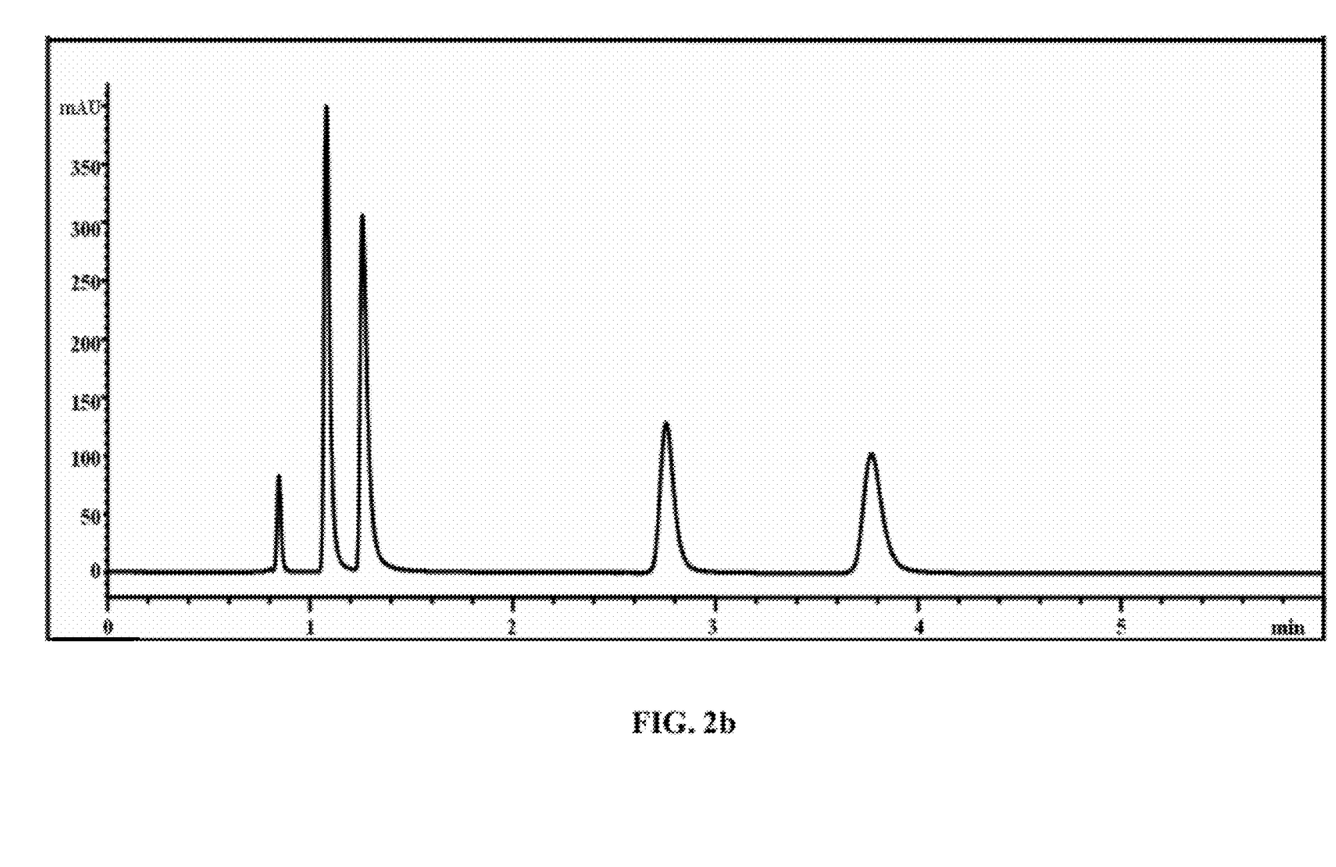
Figure 2C:
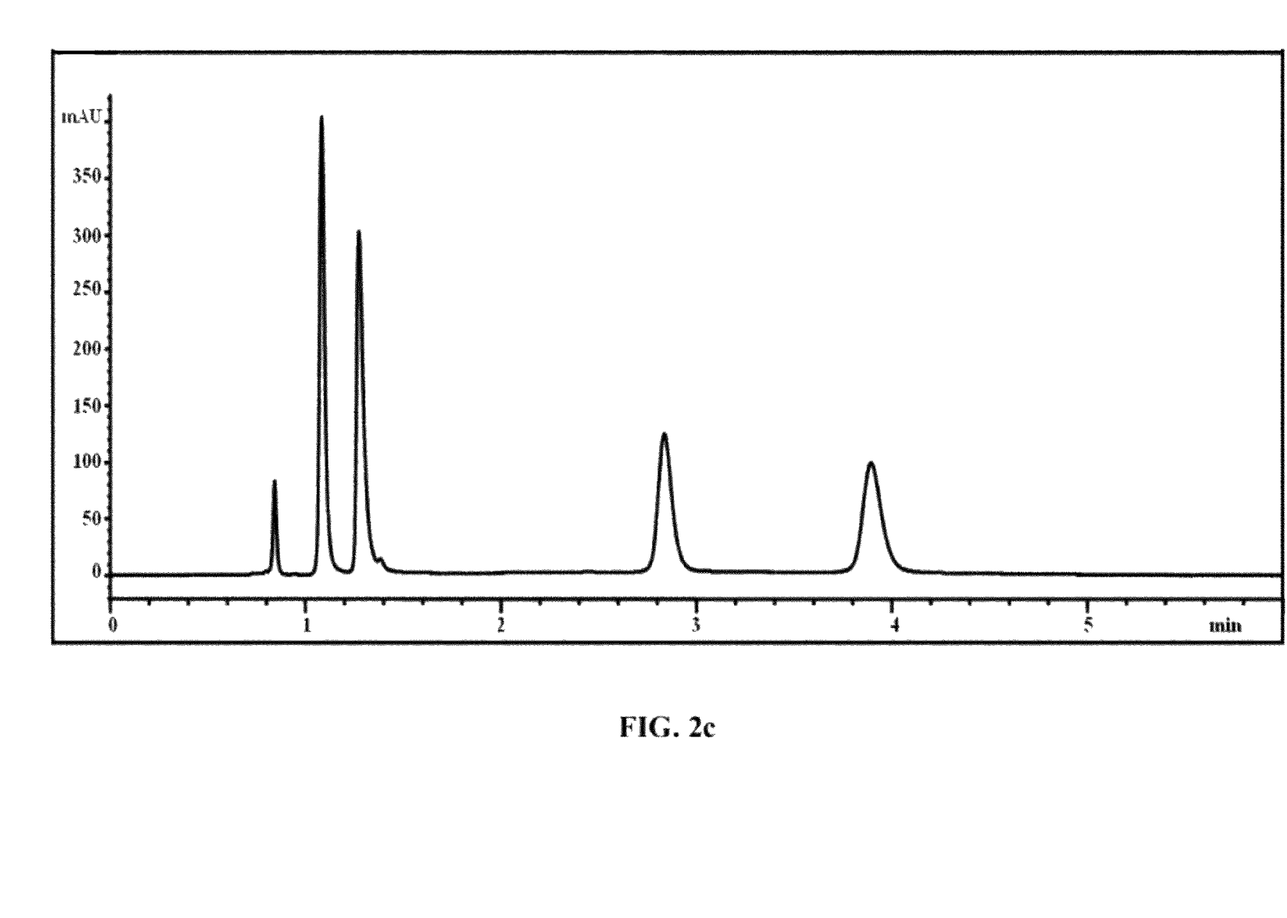

FIG. 2(a) is a chromatogram generated using the Eclipse Plus C18 column on Rx80, with tailing factor of amitriptyline (last peak) 1.67. FIG. 2(b) is a chromatogram generated using the Plus C18 column on organosilane modified silica from Example 1, with tailing factor of amitriptyline (last peak) is 1.39. FIG. 2(c) is a chromatogram generated using the Plus C18 column on organosilane modified silica from Example 2, with tailing factor of amitriptyline (last peak) is 1.23. As can be seen from FIGS. 2(a)-(c), the column with organosilane modified silica according to the present invention provides peaks with less tailing for strong bases.

Example 9

Figure 3:
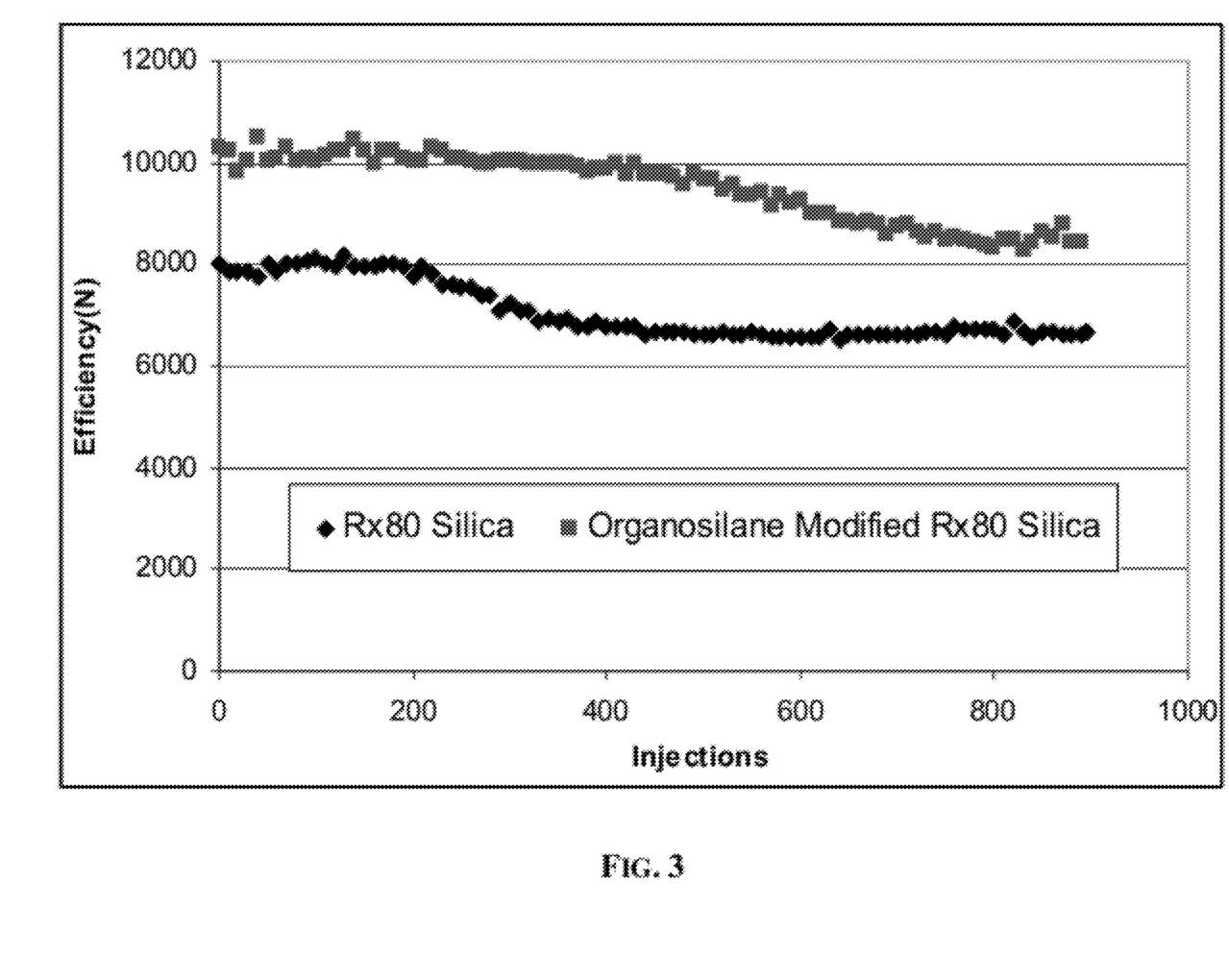
FIG. 3 is a graph illustrating the improved efficiency of organosilane modified silica according to the present invention.

In a ninth example, a lifetime test of Eclipse Plus C18 columns from organosilane modified silica (Table 1, Example 3) and non-modified silica (Table 1, Control) was performed. The dimensions of each column were 4.6×100 mm. The columns were purged with a mobile phase consisting of 40% sodium phosphate buffer (50 mM) and 60% methanol at 60 degrees at a flow rate 1 ml/min. 1 μl of 80 μg/ml naphthalene in acetonitrile was used as a test probe. The experiment was monitored at 230 nm. The approximate column volume is 1 ml. Each run lasted 10 minutes, and there were approximately 10 column volumes per injection. The summary of the results of the lifetime test, as shown in the FIG. 3, illustrate that the organosilane modified silica appears to double the life of the column at pH 7 (at 60° C., in a 50 mM phosphate buffer). The efficiency of the non-modified silica Plus C18 started to degrade after approximately 350 injections (3,500 column volumes), while the efficiency of the organosilane modified silica Plus C18 started to degrade at 700 injections (7,000 column volume).

Example 10

In a tenth example, 20 g of 5 μm silica particles from Daiso Co. (Osaka, Japan), with a surface area of 300 $m^2$/g and a pore size of 154 Å were processed as described in Example 5, except that 2 g of tetraethoxysilane (TEOS) was added instead of ethyltriethoxysilane.

Example 11

In an eleventh example, sintered silica (batch PORE092707&08) was used for a TEOS/HF study. The effects of ratio of TEOS to cores, HF concentration, reflux time, and core concentration in HF solution on final particle physical properties and chromatographic performance were study according to the following table.

For each batch, 20 g of sintered silica particles from batch PORE092707&08 with surface area 134 $m^2$/g and pore size of 122 Å, pore volume of 0.409 $cm^3$/g were slurried in HF solution (concentration and volume according to the table) in a round bottom flask equipped with a condenser. TEOS (weight according to the table) were added. The mixture was heated for reflux for certain time, and was then allowed to cool to room temperature and settle overnight. The top water layer was decanted, and 200 ml of water was added. The slurry was heated to reflux for 24 hours. The mixture was then allowed to cool to room temperature and settle overnight. 200 ml of acetone was added to slurry the silica. The silica particles were filtered, washed with acetone, and dried in vacuum oven at 100° C. for at least 2 hours.

The old rehydroxylation process by HF solution without TEOS addition, usually results in the big loss of surface area and increase of the pore size and volume. The new process in HF solution with TEOS addition can control the silica properties. The amount of TEOS and concentration of HF and reaction time affect surface area and pore size. With more TEOS added, the pore size after rehydroxylation becomes smaller; the loss of surface area becomes much less; the pore volume decreases, indicating TEOS is deposited on the pore surface, forming a new layer surface silanols.

The silica particles from each batch were then bonded with C18, and their chromatographic performance of tailing factor (Tf) of amitriptyline at pH 7.0 condition were evaluated according to Example 8.

| Batch # | Ratio of TEOS to Cores (w/w %) | HF Conc (ppm) | Reflux Time (h) | Cores in HF (w/v %) | Surface area (m²/g) | Pore size (Å) | Pore volume (cm³/g) | Tf (ami) at pH 7.0 |
|---|---|---|---|---|---|---|---|---|
| PORE0927 07&08 | | | | | 134 | 122 | 0.409 | |
| 1429.164H | 5 | 200 | 24 | 10 | 132 | 122 | 0.403 | 4.07 |
| 1429.164G | 5 | 400 | 24 | 20 | 122 | 122 | 0.371 | 1.97 |
| 1429.164D | 5 | 400 | 48 | 10 | 119 | 132 | 0.393 | 2.56 |
| 1429.164I | 5 | 200 | 48 | 20 | 127 | 122 | 0.389 | 2.26 |
| 1429.164C | 12.5 | 300 | 36 | 15 | 125 | 120 | 0.377 | 2.22 |
| 1429.164A | 20 | 400 | 24 | 10 | 122 | 118 | 0.359 | 2.00 |
| 1429.164B | 20 | 200 | 24 | 20 | 127 | 113 | 0.359 | 2.46 |
| 1429.164F | 20 | 200 | 48 | 10 | 120 | 117 | 0.353 | 2.95 |
| 1429.164E | 20 | 400 | 48 | 20 | 118 | 119 | 0.351 | 2.03 |
| 1429.164J | 20 | 400 | 24 | 20 | 121 | 117 | 0.354 | 2.36 |

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A method for preparing functionalized porous particles, the method comprising contacting in a single step, a plurality of porous silica particles with:
   a. water;
   b. an ionic fluoride; and
   c. a multifunctional organosilane.

2. The method of claim 1, wherein the ionic fluoride comprises at least one of hydrofluoric acid, ammonium fluoride, or a combination thereof.

3. The method of claim 1, wherein the plurality of porous silica particles is contacted with hydrofluoric acid.

4. The method of claim 1, wherein the multifunctional organosilane comprises a difunctional organosilane, a trifunctional silane, a tetrafunctional silane, or a combination thereof.

5. The method of claim 1, wherein the multifunctional organosilane comprises a tetrafunctional silane.

6. The method of claim 1, wherein the multifunctional organosilane comprises tetraethoxysilane, tetra(dimethylamino)silane, tetrachlorosilane, tetraacetoxysilane, or a combination thereof.

7. The method of claim 1, wherein the multifunctional organosilane comprises tetraethyl orthosilicate.

8. The method of claim 1, wherein the multifunctional organosilane comprises one or more compounds having the formula $R^1_a R^2_b SiX_{4-a-b}$ or $R(R^1_a SiX_{3-a})_n$, where $R^1$ and $R^2$ are organic ligands containing 1-4 carbon atoms, R is a substituted or unsubstituted aliphatic, cyclic, arylic, or aromatic, X is a leaving group attached to the silicon atom, a and b are positive integers equal to 0 or 1, a plus b equals to 0, 1 or 2, and n is a positive integer equal to 2-8.

9. The method of claim 8, wherein R contains from 1 to 3 carbon atoms.

10. The method of claim 8, wherein at least one of $R^1$ or $R^2$ contains from 1 to 2 carbon atoms.

11. The method of claim 8, wherein X comprises at least one of Cl, $OCH_3$, $OC_2H_5$, $(CH_3)_2N$, $(CH_3CH_2)_2N$, I, Br, CN, $OOCH_3$, $O(CO)CH_3$, $O_3SCF_3$, or a combination thereof.

12. The method of claim 8, wherein n is 2.

13. The method of claim 1, wherein contacting occurs at a temperature and for a time sufficient to form a new surface on at least a portion of the plurality of porous silica particles.

14. The method of claim 1, wherein contacting occurs at a temperature of from about ambient to about 100° C.

15. The method of claim 1, wherein the plurality of porous silica particles have an average diameter of from about 0.5 to about 50 μm.

16. The method of claim 1, further comprising reacting the functionalized porous particles with an organosilane.

17. The method of claim 16, wherein the organosilane comprises a $C_{18}$ silane.

* * * * *